(No Model.) 3 Sheets—Sheet 1.
F. F. FLETCHER.
BREECH MECHANISM FOR BREECH LOADING GUNS.
No. 499,531. Patented June 13, 1893.
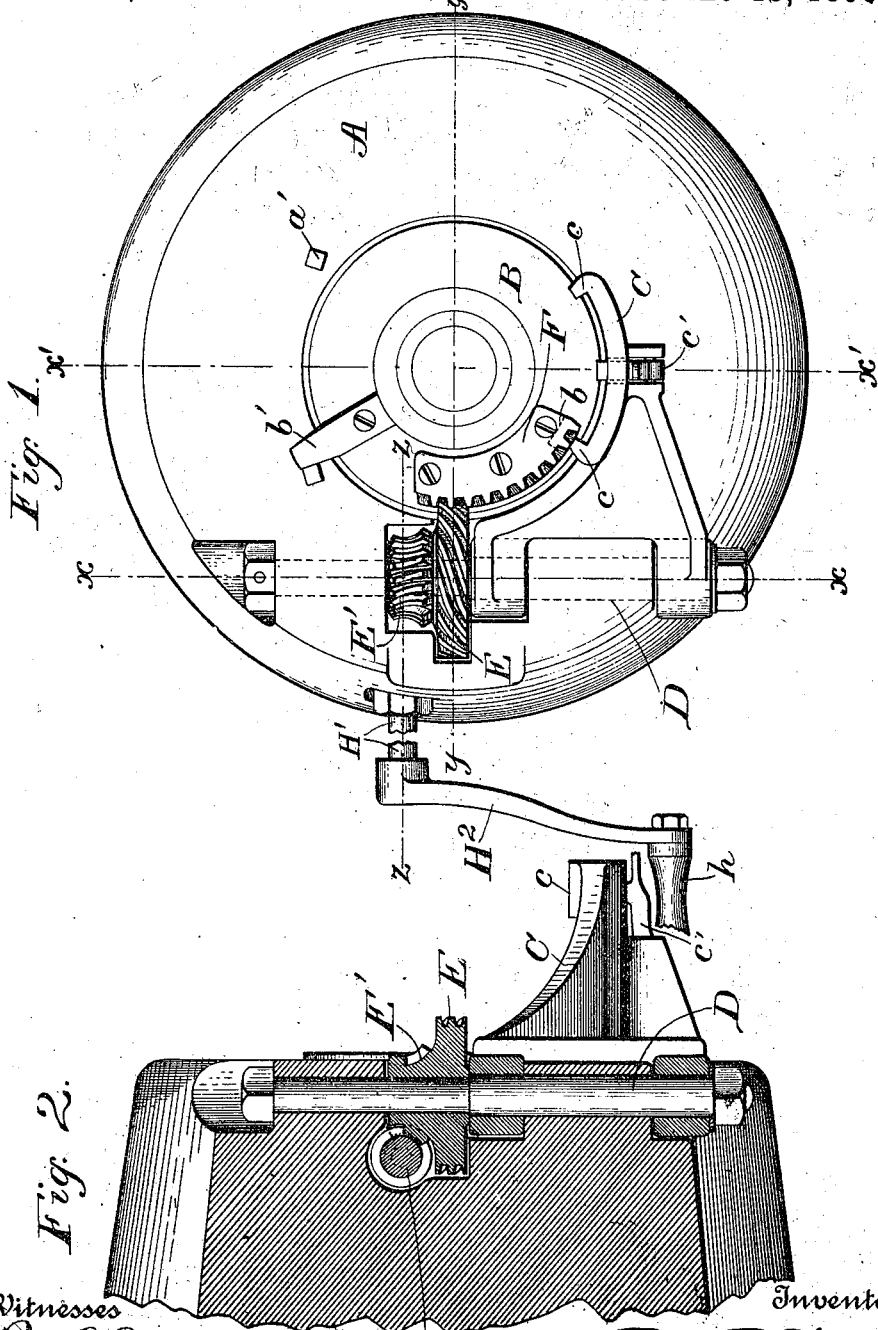
Witnesses
Percy C. Bowen
John A. Wilson
Inventor
Frank F. Fletcher
By Whitman & Wilkinson
Attorneys

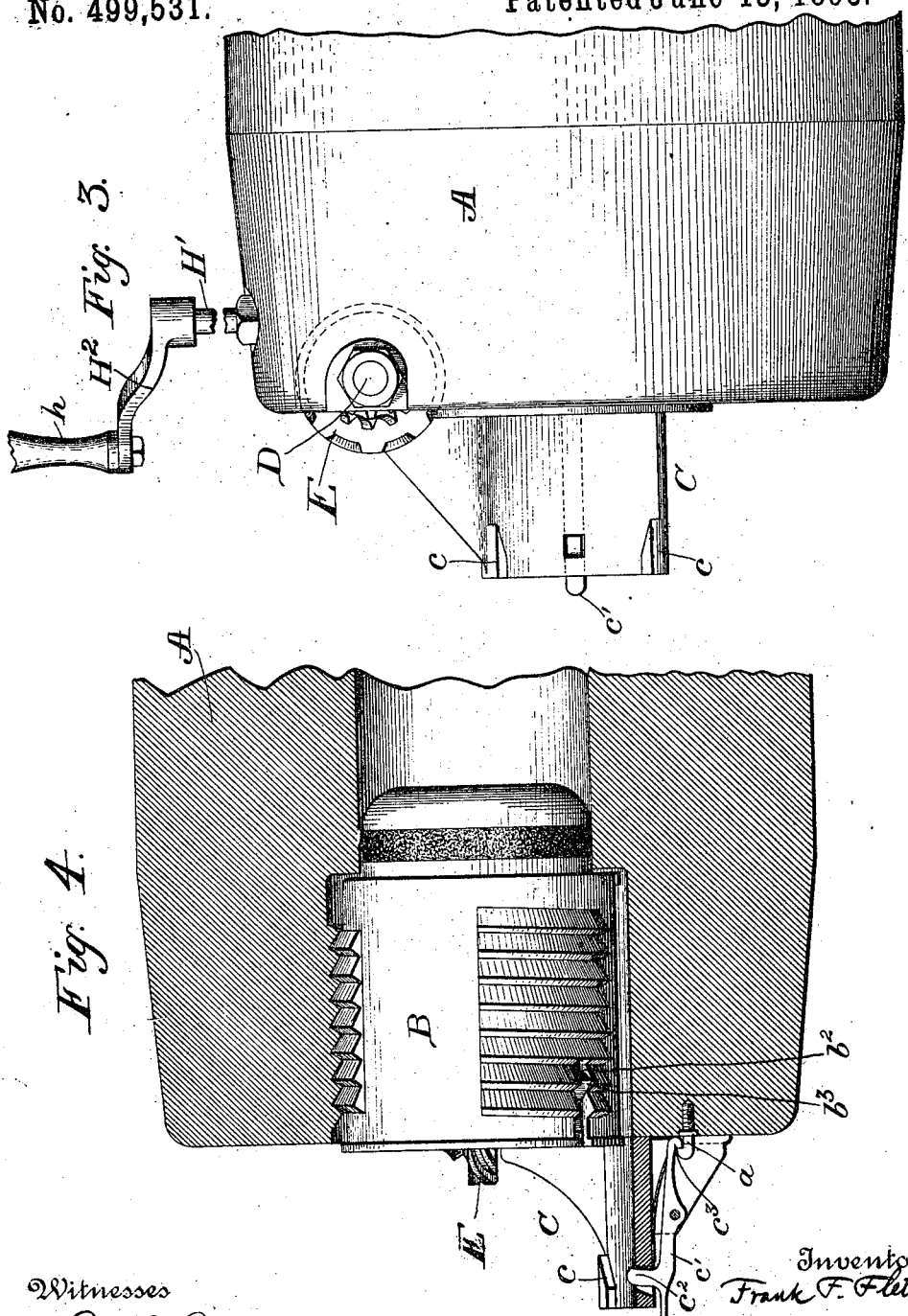

(No Model.) 3 Sheets—Sheet 3.
F. F. FLETCHER.
BREECH MECHANISM FOR BREECH LOADING GUNS.
No. 499,531. Patented June 13, 1893.
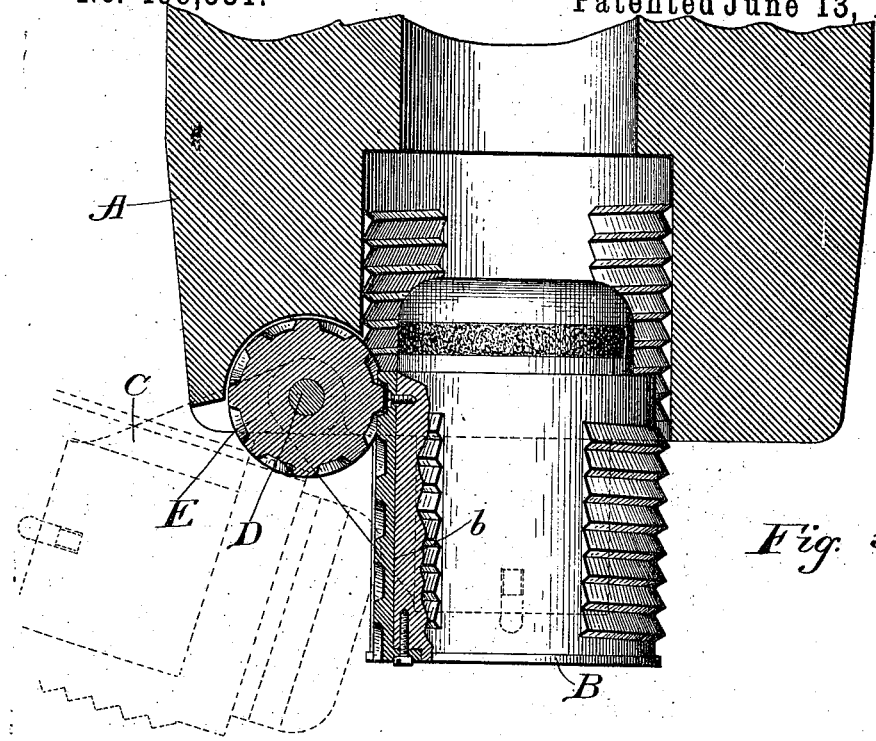
Fig. 5.
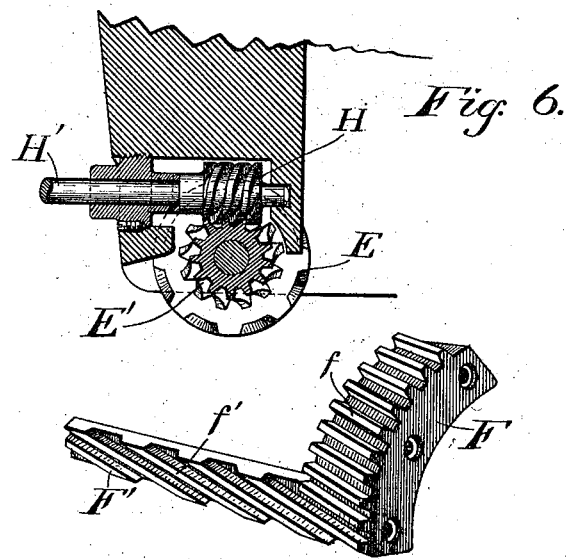
Fig. 6.
Fig. 7.
Witnesses
Percy C. Bowen
John A. Wilson
Inventor
Frank F. Fletcher
By Whitman & Wilkinson
Attorneys